United States Patent [19]

Nutter

[11] 4,015,960
[45] Apr. 5, 1977

[54] CENTRIFUGAL SEPARATOR FOR SEPARATING ENTRAINED LIQUID FROM A STREAM OF LIQUID-BEARING GASES

[75] Inventor: Dale E. Nutter, Tulsa, Okla.

[73] Assignee: Heat/Fluid Engineering Corporation, Tulsa, Okla.

[22] Filed: Mar. 17, 1975

[21] Appl. No.: 558,990

[52] U.S. Cl. .................... 55/355; 55/318; 55/428; 55/452; 55/457; 55/466
[51] Int. Cl.² ...................... B01D 45/12
[58] Field of Search .......... 55/184, 189–191, 55/203, 204, 257, 318, 235, 428, 456, 457, 459, 466, 355, 452

[56] References Cited

UNITED STATES PATENTS

| | | | |
|---|---|---|---|
| 429,347 | 6/1890 | Haskell | 55/457 X |
| 1,917,606 | 7/1933 | Sillers | 55/184 |
| 2,037,426 | 4/1936 | McKeever | 55/184 |
| 2,193,209 | 3/1940 | Sandberg | 55/355 X |
| 2,226,127 | 12/1940 | Harmon | 55/457 X |
| 2,547,190 | 4/1951 | Wilson | 55/184 |
| 2,594,490 | 4/1952 | Patterson | 55/457 X |
| 2,648,397 | 8/1953 | Ravese et al. | 55/457 X |
| 3,200,568 | 8/1965 | McNeil | 55/191 |
| 3,204,696 | 9/1965 | DePriester et al. | 55/456 X |
| 3,251,176 | 5/1966 | Gleason | 55/457 X |
| 3,345,046 | 10/1967 | Versluys et al. | 55/355 X |
| 3,481,118 | 12/1969 | Willis et al. | 55/338 |
| 3,544,087 | 12/1970 | McIlvaine | 55/457 X |
| 3,603,062 | 9/1971 | Robbins et al. | 55/457 X |
| 3,877,904 | 4/1975 | Lowrie | 55/184 X |
| 3,885,934 | 5/1975 | Eads et al. | 55/457 |

FOREIGN PATENTS OR APPLICATIONS

| | | | |
|---|---|---|---|
| 1,599,713 | 8/1970 | France | 55/457 |
| 519,881 | 11/1957 | Italy | 55/457 |

Primary Examiner—Frank W. Lutter
Assistant Examiner—Kathleen J. Prunner
Attorney, Agent, or Firm—Beveridge, DeGrandi, Kline & Lunsford

[57] ABSTRACT

A gas stream with entrained liquid is given a helical motion which causes the entrained liquid to impinge and coalesce on the wall of a separation chamber, with gases being discharged through a tailpipe which extends inwardly into the downstream end of the separation chamber. A closed second chamber surrounds the tailpipe downstream of the separation chamber. Aperture means in the tailpipe permits communication between the interiors of the second chamber and the tailpipe. A conduit means, provided downstream of the aperture means but within the tailpipe, is arranged to permit communication between the center of the tailpipe and the interior of the second chamber tending to equalize pressures so as to cause any residual liquid collected on the interior surface of the tailpipe to flow out of the tailpipe through the aperture means. Kinetic energy transfer from within the tailpipe is minimized by forming the aperture means of elongated slots which lie at an acute angle to the longitudinal axis of the apparatus and transverse to the helical flow path of gases at the wall of the tailpipe. Liquid agglomeration on the edge of the tailpipe slots is promoted by having the tailpipe slots inclined from the horizontal.

The liquid from the primary separation stage is released from the separation chamber through a liquid drain opening at the lower end of the separation chamber wall. This liquid flows into a calming chamber and thence over a weir into a downcomer which leads to a lower liquid reservoir.

18 Claims, 3 Drawing Figures

CENTRIFUGAL SEPARATOR FOR SEPARATING ENTRAINED LIQUID FROM A STREAM OF LIQUID-BEARING GASES

This invention is directed to apparatus for removing entrained liquids such as water or oil from a stream of liquid-bearing gases. Separator apparatus for this general purpose is widely used in the chemical and gas transmission industries. The present invention offers an alternative to existing apparatus of this type, and incorporates a design having several novel features.

In many respects, the invention utilizes concepts which are well known in the art. A helical flow is imparted to a stream of liquid-bearing gases within a separation chamber, whereby liquid particles are thrust outwardly by virtue of their weight, and strike the wall of the separation chamber where they coalesce into larger droplets which then flow by gravity down the wall of the separation chamber into a liquid collection area from which the liquid is discharged. Gases leave the separation chamber via a tailpipe which extends downwardly into the interior of the separation chamber and is symmetrical with the longitudinal axis of the apparatus.

It has been recognized that small amounts of liquid, termed "residual liquid" in this specification, are carried by the gaseous stream into the tailpipe. In U.S. patent specification No. 3,481,118 which issued on Dec. 2, 1969, to R. B. Willis et al, it is proposed that a circumferential gap be formed in the tailpipe to permit collection of the residual liquids. Willis et al conduct these liquids into a chamber which is maintained at a low pressure by virtue of its communication with the central axis of the helix formed by the gaseous stream in the separation chamber.

Without doubting the efficacy of the Willis et al system, I have found that similar apparatus of my design has not been able to achieve a low pressure in the gap-enclosing chamber simply by bringing this chamber into communication with the separation helix center. Thus, difficulties have been experienced in attaining the desired flow of residual liquid through a gap or any other aperture means located in the tailpipe downstream of the separation chamber. I have found that the pressure in the gap-surrounding chamber (termed a "secondary chamber" in this specification) is too high under ordinary operating conditions to permit liquid to flow through the gap. This problem is overcome by bringing the secondary chamber into communication with the center of the tailpipe, downstream of the gap or other aperture means. This tends to equalize the pressure between the secondary chamber and the interior of the tailpipe, thus causing a small amount of gas and the residual liquid to flow from the tailpipe into the secondary chamber for subsequent liquid collection and drainage to a suitable reservoir area.

Another observation I have made involves the nature of the aperture means used to conduct the residual liquid from the tailpipe. A circumferential gap in the tailpipe permits substantial transfer of the kinetic energy of the gaseous stream, into the secondary chamber, this being undesirable since it tends to increase pressure in the secondary chamber which compromises the desired effect. I have discovered that improved performance is realized when the circumferential gap is replaced by a series of angularly-disposed elongated slots which lie at an acute angle to the central longitudinal axis of the tailpipe and also lie approximately transversely to the helical path of gases within the tailpipe. Preferably, the acute angle is in the range of about 30° to 60°. This slot design minimizes the kinetic energy transfer from the tailpipe to the secondary chamber.

It has also been recognized that advantages accrue from having tailpipe apertures in the form of elongated slots inclined from the horizontal. This causes liquid which builds up on the edge of the slots to gravitate downwardly along the slots to cause further agglomeration of the liquid droplets which promotes their release from the slot.

A further aspect of the apparatus disclosed herein relates to the manner in which liquid is drained from the separation chamber. According to the preferred embodiment of the invention, the separation chamber is circumferentially surrounded by a liquid discharge chamber which is designed with an overflow weir at one side. A downcomer is located on the discharge side of the weir for the purpose of carrying the liquid to a reservoir or sump area. Liquid within the separation chamber is permitted to enter the liquid drainage chamber by means of an opening located at the lower wall of the separation chamber, preferably extending no higher than the upper edge of the overflow weir. Further, the liquid discharge opening is disposed at least 90°, and preferably in the range of about 130° to 230° from the upstream corner of the weir, so that the circularly-moving liquid will be permitted to settle somewhat to prevent it from jetting directly over the weir.

Another concept disclosed herein involves the interior surface of the tailpipe. Experience has indicated the nature of this surface has a significant effect on the ability of the tailpipe to carry liquid and release it through aperture means into a surrounding secondary chamber. If the tailpipe is formed of joined sections of different materials, the difficulties can be pronounced, and it is believed that they may be overcome by coating the interior of the tailpipe uniformly with a coating composition which is smooth to permit the continuous flow of liquid therealong.

In order to understand the invention more thoroughly, reference is made to the accompanying drawings which show a single apparatus embodying the many inventive features which may be used either alone or in conjunction with each other.

Figure 1:
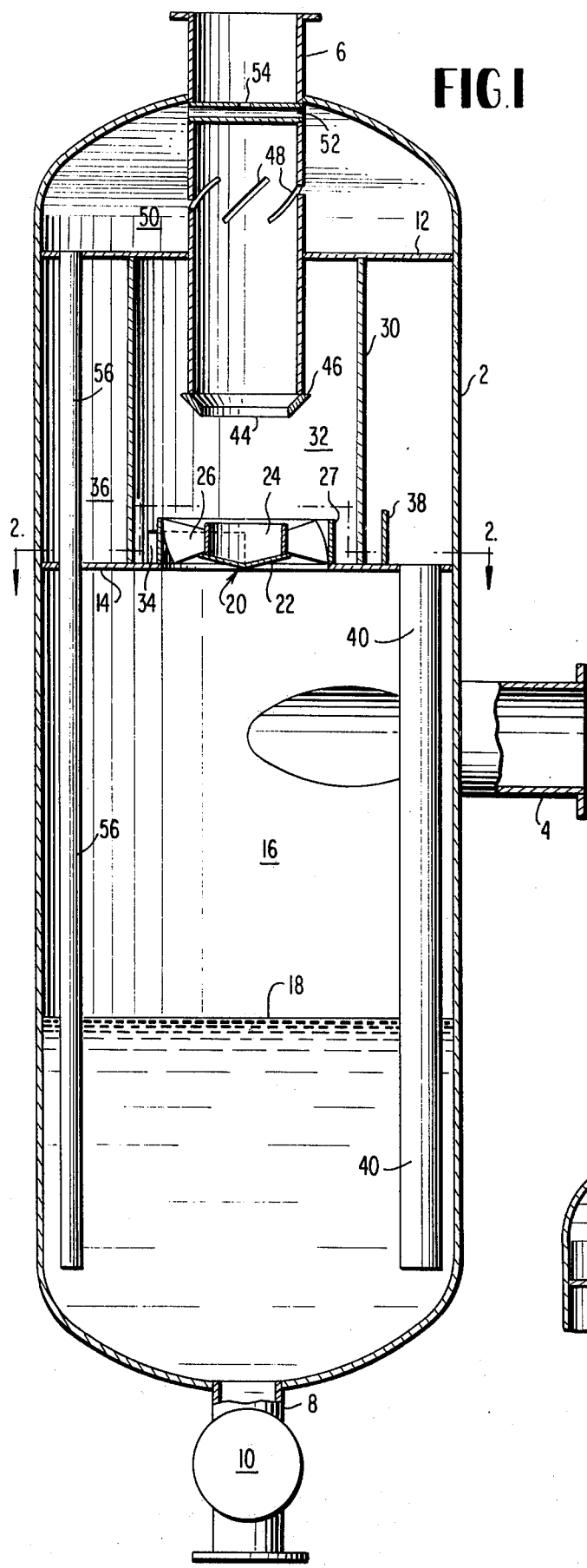
FIG. 1 illustrates a sectional view of an apparatus constructed according to the invention; and, FIG. 2 is a sectional view taken along the line 2—2 in FIG. 1, wherein the section line is offset to show the complete downstream face of the tuyere assembly.

In FIG. 1, it will be seen that a single pressure vessel 2 encloses the separator assembly. The liquid-bearing gases enter the vessel 2 through the mixture inlet pipe 4 which is tangential to the exterior wall of the vessel. The deentrained gases leave the vessel 2 through the gas outlet tailpipe 6, and liquid may be drawn from the vessel through the liquid discharge pipe 8 which is provided with a draw-off valve 10.

Within the vessel 2, there are two horizontal partitions 12 and 14 which divide it into upper, intermediate and lower chambers. The lower chamber 16 forms a space for primary centrifugal separation and a sump for receiving all liquid removed from the gaseous stream. The liquid level is maintained nominally at the position indicated, 18. Within this lower chamber 16, a significant portion of the liquid separates from the liquid-bearing gases by virtue of the circular motion imparted by their tangential introduction into the apparatus by the inlet pipe 4. The vessel 2, is sized to provide adequate volume and head to assure positive control of the operating liquid level 18, while providing positive liquid seals on the downcomer pipes 40 and 56. This preserves the pressure differential between the chambers at opposite ends of the downcomer pipes 40 and 56. The intermediate chamber between the partitions 12 and 14 is the principal area where liquid is deentrained from the gaseous stream. Liquid-bearing gases pass upwardly from the lower chamber through a bladed tuyere 20 which is positioned in a central opening in the annular partition 14. The details of construction of this tuyere are the subject matter of prior applications Ser. No. 371,425, filed June 19, 1973 now U.S. Pat. No. 3,885,935 and Ser. No. 371,426, filed June 19, 1973 now U.S. Pat. No. 3,885,934, both of which are incorporated herein by reference. Such tuyeres include a nosecone deflector 22 mounted on the upstream end of a central hub 24 and a plurality of blades 26 which extend radially from the hub to a cylindrical rim 27. The surfaces of these blades are inclined at an angle of about 45°, preferably between 30° and 60°, with respect to the central vertical axis of the tuyere 20. Each of the blades is provided with a liquid-trapping lip, not shown, which forms a trough tending to prevent reentrainment of any liquid which may have been removed from the gaseous stream by impingement on the upstream face of the deflector or the blades. The underlying principles of this construction are described in the previously-mentioned patent applications.

The intermediate chamber contains a cylindrical impingement wall 30 which is disposed symmetrically about the vertical longitudinal axis of the apparatus. The area within this cylindrical wall 30 is the separation chamber 32. Within this chamber, the ascending helical flow of gases centered about the longitudinal axis causes particles of liquid entrained in the gases to be thrust outwardly by centrifugal action to impinge and coalesce on the interior surface of the separation chamber wall 30. The coalesced liquid then drains downwardly along the wall and into the space between the tuyere 20 and the wall 30.

Figure 2:
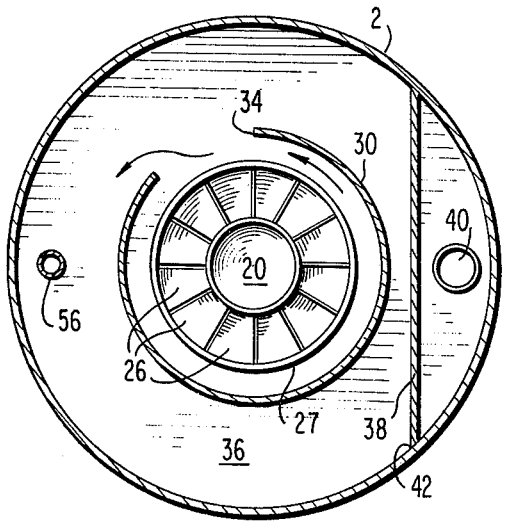

Liquid moves in a circular path and outwardly from the space between the cylindrical rim 27 and the wall 30 into the liquid drainage area which is that portion of the intermediate chamber which lies exteriorly of the separation chamber wall 30. This flow occurs through a liquid discharge opening 34 which has a lesser height than cylindrical rim 27 of the tuyere. The circumferential location of the liquid discharge opening 34 is best seen in FIG. 2.

A deentrained liquid chamber 36 surrounds the separation chamber wall 30.

Liquid flowing from the liquid discharge opening 34 into the chamber 36 may have a significant tangential velocity component as it enters the chamber 36. It moves in a circular direction in chamber 36 until it is released from the chamber 36 by flowing over the upper edge of the weir 38 into a downcomer 40 which leads to the sump in the lower chamber of the apparatus. The upper edge of the weir 38 is positioned at least as high as the upper portion of the liquid drainage opening 34. This maintains a liquid level in the chamber 36 which obstructs the opening 34 and prevents the flow of gases therethrough.

In order to prevent the liquid from flowing prematurely over the weir 38 and into the downcomer 40, it is desirable that the opening 34 be spaced at a considerable circumferential displacement from the upstream corner 42 of the weir 38. In the illustrated embodiment, the opening 34 is approximately diametrically opposed to the upstream corner 42 of the weir 38, the term "upstream" being used to denote an upstream direction relative to the direction of liquid flow indicated by the arrows in FIG. 2. According to one aspect of the invention, the angular distance between the point 42 and the opening 34, measured upstream from corner 42 (clockwise in FIG. 2), should be at least 90° and preferably in the range of about 130° to 230°. This permits the liquid to settle somewhat while in the space 36, thus preventing it from jetting prematurely over the weir 38.

Within the separation chamber 32, the gases continue their upward helical movement into the outlet opening 44 at the lower end of the gas outlet tailpipe 6. A deflector/barrier element 46 is provided on the lower upstream end of the tailpipe 6.

As the gaseous stream continues its helical movement upwardly within the tailpipe 6, some further liquid, called residual liquid in this specification, will coalesce on the interior wall of the outlet pipe. Some of this liquid may flow gravitationally downwardly where it reenters the separation chamber 32, but a portion of this liquid will be driven upwardly by the ascending gases, following a helical path. Eventually, this path will lead to the opening means which are provided in the tailpipe for release of residual liquid. In FIG. 1, these openings are shown as inclined elongated slots 48 which are disposed at an acute angle to the vertical longitudinal axis of the apparatus. It will be observed that these slots lie transversely to the helical flow so that they will be in the path of the ascending liquid on the interior wall of the tailpipe 6. The slots 48 are illustrated at a disposition of about 45° to the vertical longitudinal axis of the apparatus, and it is preferred that they be at an angle of about 30° to 60° thereto.

The slots 48 are located within the upper chamber 50 of the apparatus which will be referred to as the secondary chamber 50.

It is desirable that a minimum of kinetic energy of gases within the tailpipe 6 will be transferred into the secondary chamber 50, and that the residual liquid be able to flow readily into the secondary chamber 50. The arrangement of the slots 48 minimizes the energy transfer into the secondary chamber 50, but the buildup of pressure therein can be such that liquid cannot flow freely through the slots 48 into the secondary chamber 50.

Figure 3:
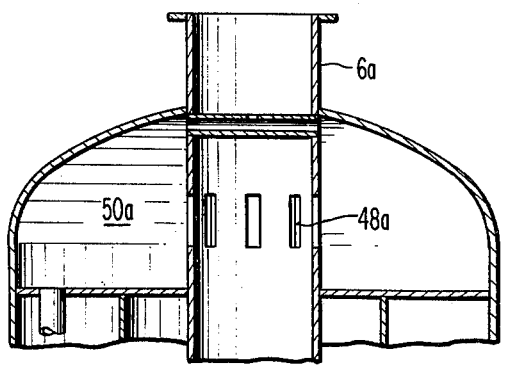
FIG. 3 shows a modification with vertical tailpipe slots.

Whenever elongated tailpipe slots are inclined from the horizontal, the droplets of liquid which form on the edges of the slots flow downwardly along the slot, this causing their agglomeration into larger droplets which are more readily released from the slot area. This advantage is realized by the embodiment of FIGS. 1 and 2, but it also is realized by the embodiment of FIG. 3. Here it will be seen that the tailpipe 6a has slots 48a which are oriented axially and vertically. Liquid droplets which tend to build up on the vertical edge of the slot 48a will flow downwardly under the influence of gravity, agglomerating into larger droplets which are then released from the slot and flow into the chamber 50a.

It has been found that a suitable manner of maintaining an appropriate pressure differential across the slots 48 is to provide means for communicating between the chamber 50 and the center of the tailpipe 6 at a point downstream of the slots 48. This means is illustrated in FIG. 1 as a crosspipe which extends diametrically through the tailpipe 6 so that both ends of the crosspipe 52 communicate with the secondary chamber 50. At the center of the crosspipe are downstream-facing apertures 54, preferably located at the center of the tailpipe where the pressure is the lowest due to the helical movement of gases.

Any liquid which collects in the secondary chamber 50 is then delivered by a downcomer 56 into the sump area in the lower chamber of the apparatus.

Preliminary experimentation with apparatus of the type shown herein has indicated a tendency in some cases for liquid to flow in a nonuniform manner on the interior wall of the tailpipe 6, particularly in instances where the tailpipe was formed of segments of different materials. Others have proposed the use of a coating to provide a uniform, smooth wall on surfaces to obtain a stable surface flow of liquids with low surface tension. Therefore, some systems using the invention may require the application of a coating to the inside of a tailpipe to provide a uniform, smooth wall surface of uniform physical properties in order to permit the tailpipe slots to perform as desired.

Persons skilled in the art will realize that the invention may take many embodiments other than the preferred one. The different aspects of the invention are best utilized together, but this is not necessary. For example, the angular tailpipe slots 48 may be replaced with a circumferential gap or a pattern of axially oriented slots 48a without detracting from the advantages of the separator chamber construction and drainage system or the crosspipe 52. Likewise, means performing the function of the crosspipe 52 may be used in diverse systems, as may be the construction of the separator chamber and its drainage accommodations.

In view of the many ways in which the inventive concepts herein may be used, it is emphasized that the invention is not limited to the sole disclosed embodiment, but is intended to cover many different embodiments within the spirit of the claims which follow.

I claim:

1. Apparatus for separating entrained liquid from a stream of liquid-bearing gases, comprising,
    a circular wall forming a separation chamber which has a longitudinal axis, an upstream end, and a downstream end which is disposed above the upstream end, said wall having an interior surface equidistant from and facing the longitudinal axis,
    means at the upstream end of the separation chamber for producing a tangential velocity component causing a helical flow of said liquid-bearing gases which flow is centered about the longitudinal axis and extends upward from the upstream end toward the downstream end of the separation chamber, whereby the particles of liquid entrained in the gases are thrust outwardly by centrifugal action to impinge and coalesce on said interior surface of the separation chamber wall,
    a gas outlet tailpipe extending centrally and longitudinally into the separation chamber from the downstream end of the separation chamber, said tailpipe having an upper outlet opening means and a lower inlet opening means for receiving a central portion of the helical flow of gases which has only a residual amount of entrained liquid,
    said tailpipe having aperture means therein located above and downstream of said inlet opening means, whereby residual liquid in the tailpipe is conducted from the tailpipe through the aperture means,
    a lower liquid sump, a closed secondary chamber surrounding the aperture means, and drain conduit means for carrying liquid from the secondary chamber to the sump, said drain conduit means having an outlet opening submerged in liquid in the sump to sustain a pressure differential between the secondary chamber and the sump,
    said apparatus having conduit means communicating between said secondary chamber and a point substantially at the center of said tailpipe downstream of the aperture means to reduce the pressure differential across said aperture means in the tailpipe and thus promote the flow of residual liquid through said aperture means.

2. The apparatus of claim 1 having a single pressure vessel enclosing the separation chamber, the sump and the secondary chamber, said pressure vessel having an inlet opening for said liquid-bearing gases, said tailpipe having its upper outlet opening means extending from said pressure vessel.

3. The apparatus of claim 1 wherein the aperture means comprises a plurality of elongated slots which lie substantially parallel to said longitudinal axis.

4. The apparatus of claim 1 wherein the aperture means comprises a plurality of elongated slots which lie at an acute angle to said longitudinal axis and transverse to the helical flow path of gases within the tailpipe.

5. The apparatus of claim 4 wherein the acute angle is about 30° to 60°.

6. The apparatus of claim 1 wherein the means for producing a helical flow of vapor includes a plurality of blades which extend transversely from and have faces inclined with respect to the longitudinal axis.

7. The apparatus of claim 6 wherein the faces of the blades are inclined about 30° to 60° to the longitudinal axis.

8. The apparatus of claim 1 wherein the wall of the separation chamber is provided with a lower liquid drain opening for releasing the liquid from the separation chamber, a deentrained liquid chamber surrounding the wall of the separation chamber and communicating with the separation chamber through the lower liquid drain opening so as to collect the liquid released from the separation chamber,
    a downcomer communicating with the deentrained liquid chamber so as to discharge the liquid from the deentrained liquid chamber, and an overflow weir positioned in the deentrained liquid chamber in the flow path between the lower liquid drain opening and the downcomer, said downcomer having an outlet opening submerged in liquid in the sump, and wherein one of said deentrained liquid chamber or said sump is closed to atmosphere to sustain a pressure differential between the deentrained liquid chamber and said sump.

9. The apparatus of claim 8 wherein the overflow weir has an elevation at least as high as the uppermost portion of the lower liquid drain opening, whereby liquid in the deentrained liquid chamber will maintain a depth sufficient to obstruct the release of gases through the liquid drain opening.

10. The apparatus of claim 8 wherein the liquid in the deentrained liquid chamber flows in a circular direction, and said liquid drain opening is circumferentially positioned at least about 90° upstream of the overflow weir to deter the jetting of liquid over the overflow weir.

11. The apparatus of claim 8 wherein the liquid in the deentrained liquid chamber flows in a circular direction, and said liquid drain opening is circumferentially positioned about 130° to 230° upstream of the overflow weir to deter the jetting of liquid over the overflow weir.

12. Apparatus for separating entrained liquid from a stream of liquid-bearing gases, comprising,
   a circular wall forming a separation chamber which has a longitudinal axis, an upstream end, and a downstream end which is disposed above the upstream end, said wall having an interior surface equidistant from and facing the longitudinal axis,
   means at the upstream end of the separation chamber for producing a tangential velocity component producing a helical flow of said liquid-bearing gases which flow is centered about the longitudinal axis and extends upward from the upstream end toward the downstream end of the separation chamber, whereby the particles of liquid entrained in the gases are thrust outwardly by centrifugal action to impinge and coalesce on said interior surface of the separation chamber wall,
   a gas outlet tailpipe extending centrally and longitudinally into the separation chamber from the downstream end of the separation chamber, said tailpipe having an upper outlet opening means and a lower inlet opening means for receiving a central portion of the helical flow of gases which has only a residual amount of entrained liquid,
   said tailpipe having aperture means therein located above and downstream of said inlet opening means, whereby residual liquid in the tailpipe is conducted from the tailpipe through the aperture means,
   a lower liquid drain opening in the wall of the separation chamber for releasing the liquid from the separation chamber, a deentrained liquid chamber surrounding the wall of the separation chamber and communicating with the separation chamber through the lower liquid drain opening so as to collect the liquid released from the separation chamber, the liquid flowing in a circular direction within the deentrained liquid chamber,
   a downcomer communicating with the deentrained liquid chamber so as to discharge the liquid from the deentrained liquid chamber, and an overflow weir positioned in the deentrained liquid chamber in the flow path between the lower liquid drain opening and the downcomer, said lower liquid drain opening being disposed upstream of the overflow weir in the flow direction such that the overflow weir interrupts the circular flow of the liquid.

13. The apparatus of claim 12 wherein the overflow weir has an elevation at least as high as the uppermost portion of the lower liquid drain opening, whereby liquid in the deentrained liquid chamber will maintain a depth sufficient to obstruct the release of gases through the liquid drain opening.

14. The apparatus of claim 12 wherein the liquid drain opening is circumferentially positioned at least about 90° upstream of the overflow weir to deter the surging of liquid over the overflow weir.

15. The apparatus of claim 12 wherein the liquid drain opening is circumferentially positioned about 130° to 230° upstream of the overflow weir to deter the surging of liquid over the overflow weir.

16. The apparatus of claim 12 wherein the means for producing a helical flow of gases includes a plurality of blades which extend transversely from and have faces inclined with respect to the longitudinal axis.

17. The apparatus of claim 16 wherein the faces of the blades are inclined about 30° and 60° to the longitudinal axis.

18. The apparatus of claim 12 having a rim surrounding the means for producing a tangential velocity component, said rim being spaced below said tailpipe and radially inwardly of the circular wall which forms the separation chamber to form an annular space for receiving the liquid between said circular wall and said rim, said rim having an upper edge which is at a higher elevation than said lower liquid drain opening, said upper edge being at a lower elevation than said tailpipe.

* * * * *